United States Patent [19]

Lewis

[11] 3,922,960
[45] Dec. 2, 1975

[54] AUTOMATIC BASTING DEVICE
[75] Inventor: Bob Lewis, Louisville, Ky.
[73] Assignees: T. M. Sullivan; Joseph A. Manners, Sr., both of Clarksville, Ind.
[22] Filed: Nov. 12, 1973
[21] Appl. No.: 414,977

[52] U.S. Cl. ................................. 99/346; 99/345
[51] Int. Cl.[2] ......................................... A47J 37/10
[58] Field of Search .............................. 99/345, 346

[56] References Cited
UNITED STATES PATENTS
910,318    1/1909   Schaefer ............................... 99/346
1,687,099  10/1928  Lann ..................................... 99/346

Primary Examiner—Harvey C. Hornsby
Assistant Examiner—Donald B. Massenberg
Attorney, Agent, or Firm—William R. Price

[57] ABSTRACT

Discloses an automatic basting device comprising a base support and immersion plate for installation on the bottom of a baking pan. A delivery and dispensing tube is in open communication with said immersion plate and receives boiling hot meat juices and broth from the space formed between the bottom of the plate and the bottom of the baking pan and automatically dispenses same over the turkey or other meat during the baking process. Due to the fact that the hot broth and meat drippings tend to be delivered in discrete quantities due to "bumping" of the boiling liquids, difficulty has been encountered in propelling the boiling liquid out of the pan. Consequently, this invention provides means for projecting the boiling hot meat juices downwardly over the meat in the pan and for preventing discharge of the boiling liquid out of the pan during the baking process.

2 Claims, 4 Drawing Figures

U.S. Patent Dec. 2, 1975 3,922,960
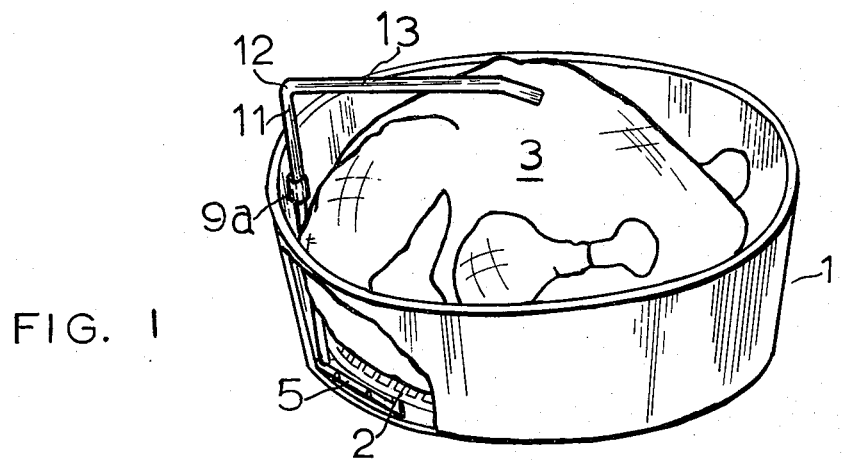
FIG. 1
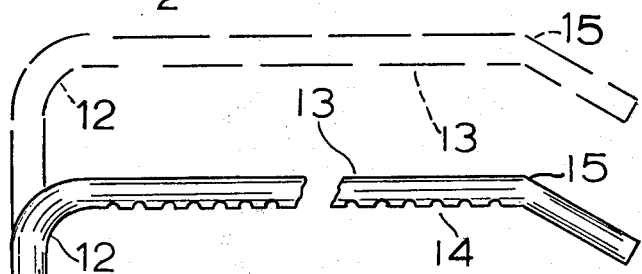
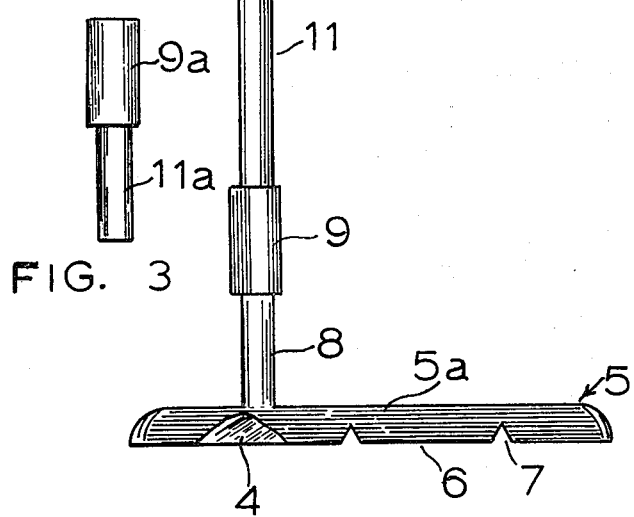
FIG. 2
FIG. 3
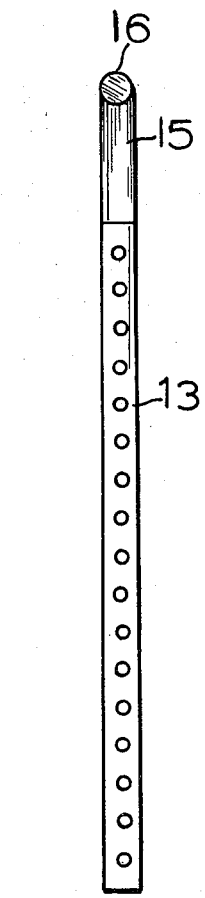
FIG. 4

AUTOMATIC BASTING DEVICE

FIELD OF THE INVENTION

This invention relates to the culinary arts. More specifically, this invention relates to an improved automatic basting device for basting turkey or other meats in a baking pan automatically during the baking process.

SUMMARY OF THE PRIOR ART

Devices have been proposed for automatically basting meat and fowl during the baking process. It is, of course, essential to provide meat juices and broth to the meat as it bakes in order to prevent dryness, graininess and toughness of the baked meat. As early as 1895, Charles Edward Cole, in British Patent No. 15,370, proposed a device for installation in a well of a baking utensil for collecting the succulent meat juices and broth from the meat being baked and delivering same through a vertical tube and through a rather elaborate, open top basting apparatus. Subsequent inventors, as, for example, S. A. Holloway, In U.S. Pat. No. 1,339,625; Miller in U.S. Pat. No. 1,719,713; West in U.S. Pat. No. 3,713,378; and Frau Amalie Monhart in Swiss Pat. No. 185,901, have proposed other apparatus for automatically delivering the meat juices from the bottom of the pan through a vertical delivery tube and dispensing same over the meat or fowl to be basted. All of the later patents, however, have found it necessary to actually impale the bird over a pointed tubular delivery tube, thus destroying the integrity of the roast or of the basted bird. Only Cole, in the original patent of 1895, proposed a device whereby the roast or fowl would not be impaled, and his device was faced with the problem of accidental discharge of the boiling meat liquid out of the pan through the open faced dispensing or basting network.

SUMMARY OF THE PRESENT INVENTION

According to the invention, there is provided an apparatus which collects the boiling hot meat juices and drippings and broth in the bottom of the pan through the means of a base esupport and immersion plate. A delivery and dispensing tube is in open communication with the space formed between the floor of the plate and the floor of the baking utensil. Thus, the tube delivers the boiling hot succulent juices up the vertical arm of the tube and along the horizontal dispensing arm for basting the bird. It was found, however, that due to the propensity of the boiling liquids to bump, discrete volumes of boiling liquid were apt to be propelled from the end of the tube out of the pan. This made the opening of the pan to examine the progression of the baking almost impossible and presented a serious fire hazard. Thus, according to this invention, there is provided a down-turned distal portion of the open tube, thus directing the juices downwardly to provent propelling of said juices out of the pan.

BRIEF DESCRIPTION OF THE DRAWINGS

Referring now to the drawings,

FIG. 1 is a view in prespective of the automatic basting device of this invention in use.

FIG. 2 is a side elevation of the device of this invention in full lines with the height adjustment illustrated in phantom lines.

FIG. 3 is a side elevation of a segment of the delivery tube which can be added to elevate the dispensing arm for large turkeys and the like.

FIG. 4 is a plan view, viewed from the bottom, illustrating the dispensing openings of the delivery and dispensing arm, and the open end of the down-turned distal portion of the tube.

DESCRIPTION OF THE PREFERRED EMBODIMENT

Referring now to the drawings in detail, a baking pan 1 is illustrated containing a baking rack 2 and a turkey 3, supported on said baking rack. A base support and immersion plate 5 contains a down-turned peripheral rim 6 containing notches 7 through which liquid in the bottom of the pan can be collected in the collection space 4 formed by the bottom of the baking pan and the top planar portion 5a of the immersion plate 5. A tubular stub 8 extends through the top of the base support plate and communicates with the collecting space 4 formed between the planar surface 5a of plate 5 and the bottom of the pan. A collar 9 acts as a coupling between the stub and the delivery and dispensing tube 10. The delivery and dispensing tube 10 is made up of a tubular vertical arm 11, a tubular elbow 12 and a tubular horizontal delivery and dispensing arm 13. As shown in this drawing, the three elements of the delivery and dispensing tube, i.e., vertical arm 11, elbow 12 and horizontal dispensing and delivery arm 13, are one piece. It is, of course, within the scope of this invention to make these as separate pieces which can be joined together by coupling collars such as illustrated by numeral 9.

Referring now to FIGS. 2 and 4, the bottom of the tubular horizontal delivery and basting arm 13 contains a series of openings along its length so that hot juices delivered through the delivery and dispensing tube 10 are dripped over the top of the meat in the basting pan. The distal portion 15 of the tubular horizontal delivery and basting arm 13 is turned downwardly so that any juices that are not delivered through the dispensing openings 14 are directed down over the meat in the pan and are prevented from being propelled out of the pan. This prevents the sudden propulsion of a volume of boiling hot liquid into the oven from the pan or onto the cook who is examining the roast to see how it is progressing.

In order to allow for some adjustment of the height of the device, there is provided a tubular extension 11a containing a collar 9a which can be inserted into the collar 9 and into the end of the tubular vertical arm 11 to thus raise the entire tubular horizontal delivery and basting arm 13 higher for a large turkey or other large roast. The open end of the distal down-turned end of the horizontal arm 13 is designated by the numeral 16.

It should be clear that many modifications will occur to those skilled in the art from the detailed description hereinabove given, and any modifications are considered to be within the scope of this invention.

I claim:

1. An automatic basting device, comprising in combination:

A. a base support and an immersion plate for installation on the bottom of a baking pan and a baking rack carried in said pan above said plate for supporting meat to be cooked;

1. said plate having a down-turned peripheral rim portion and a raised planar portion which forms a collection space between the bottom of said pan and the bottom surface of said raised planar portion, and,
2. openings in said rim of said plate for admission of meat drippings and broth from said meat as it is being cooked into said collection space, B. a delivery and dispensing tube in open communication with said collection space of said plate for receiving boiling meat drippings and broth from said collection space and for delivering and dispensing same to baste meat in said pan, which comprises:
1. a tubular vertical delivery arm;
2. an open ended tubular horizontal delivery and dispensing arm, and;
3. a tubular elbow joining said tubular vertical and horizontal arms together;

the improvement in said automatic basting device, which comprises:
C. openings in the bottom of said horizontal delivery and dispensing arm for dispensing the boiling hot drippings and broth over the meat, and,
D. a down-turned portion at the open distal end of said horizontal tubular arm for directing the boiling hot meat drippings and broth downwardly through said open distal end over the meat and thus prevent discharge of said boiling hot meat drippings and broth out of the pan.

2. An automatic basting device, as defined in claim 1, the further combination of:
A. an accessory tubular extension for said vertical arm of said delivery and dispensing tube, which includes:
1. a short length of tube, and,
2. a collar for coupling said length of tube to said vertical arm of said delivery and dispensing tube,
B. the further combination therewith of a tubular stub projecting from said base support and immersion plate and communicating with the collection space formed by said plate and said baking pan, and
C. means for joining said tubular stub to said accessory tubular extension.

* * * * *